United States Patent
Suzuki et al.

(10) Patent No.: US 8,281,089 B2
(45) Date of Patent: Oct. 2, 2012

(54) STORAGE SYSTEM AND ITS INITIAL COPY METHOD

(75) Inventors: Hidenori Suzuki, Atami (JP); Hironobu Inoue, Odawara (JP)

(73) Assignee: Hitachi, Ltd., Tokyo (JP)

( * ) Notice: Subject to any disclaimer, the term of this patent is extended or adjusted under 35 U.S.C. 154(b) by 337 days.

(21) Appl. No.: 12/595,403

(22) PCT Filed: Feb. 25, 2009

(86) PCT No.: PCT/JP2009/054219
§ 371 (c)(1),
(2), (4) Date: Oct. 9, 2009

(87) PCT Pub. No.: WO2010/097962
PCT Pub. Date: Sep. 2, 2010

(65) Prior Publication Data
US 2011/0179241 A1    Jul. 21, 2011

(51) Int. Cl.
*G06F 12/00* (2006.01)
(52) U.S. Cl. ............................. 711/161; 714/2
(58) Field of Classification Search .................. 711/161; 714/2
See application file for complete search history.

(56) References Cited

U.S. PATENT DOCUMENTS

| | | | |
|---|---|---|---|
| 6,073,221 A | 6/2000 | Beal et al. |
| 7,032,089 B1 | 4/2006 | Ranade et al. |
| 7,434,093 B2 | 10/2008 | Ohran |
| 2003/0014534 A1 | 1/2003 | Watanabe et al. |
| 2006/0277376 A1 | 12/2006 | Watanabe et al. |

FOREIGN PATENT DOCUMENTS

JP    2006-338250 A    12/2006

*Primary Examiner* — Matthew Bradley
(74) *Attorney, Agent, or Firm* — Sughrue Mion, PLLC

(57) ABSTRACT

Upon starting the initial copy process, a pair creation command is issued from a primary disk subsystem to a secondary disk subsystem. The secondary disk subsystem sets a target area of a second disk drive to an unwritten status, and thereafter writes update data that was updated in a primary site into a designated area of the second disk drive. Subsequently, when data of a first disk drive is backed up to an external medium, the external memory medium is transported to a secondary site, and then connected to a host computer. Unwritten data among the backup data recorded in the external memory medium is thereafter restored to the first disk drive, and the initial copy is completed on the condition that all data in the first disk drive has been copied to the second disk drive.

10 Claims, 16 Drawing Sheets

FIG.9

202 ～ paircreate-g Oradb-f never-vl-mincopy

STORAGE SYSTEM AND ITS INITIAL COPY METHOD

TECHNICAL FIELD

The present invention relates to technology of recording data of a logical device in a memory apparatus installed at a primary site to a logical device in a memory apparatus installed at a secondary site in order to achieve the redundancy of such data.

BACKGROUND ART

In recent years, in order to prevent the loss of data stored in a memory apparatus in the event of a failure or a disaster, measures are being taken to achieve the redundancy of data, for instance, by connecting a plurality of physically-separated sites with a communication line, sending data of a primary logical device in a primary memory apparatus installed at a primary site to a secondary memory apparatus installed at a remote secondary site via a communication line, and recording such data in the secondary logical device of the secondary memory apparatus at the secondary site.

Remote copy is known as backup technology for achieving the redundancy of data. Remote copy is a technique of setting copy-target volumes in a primary memory apparatus as the copy source and a secondary memory apparatus as the copy destination, and copying data from the primary logical device to the secondary logical device so that data of the primary logical device in the primary memory apparatus and data of the secondary logical device in the secondary memory apparatus will mutually coincide.

By using the remote copy technique, with corporations, for instance, it will be possible to consolidate, in real time, data of memory apparatuses of the respective sites in the memory apparatuses within the data center. Incidentally, the pair configured from a primary logical device and a secondary logical device is referred to as a remote copy pair. In order to create a remote copy pair, it is necessary to copy all data of the primary logical device to the secondary logical device. This copy process is referred to as an initial copy.

Normally, the initial copy is performed with a method of transferring remote copy target data in the primary memory apparatus via a network connecting the primary memory apparatus and the secondary memory apparatus. However, with this method, since vast amounts of data are transferred via the communication network connecting the primary memory apparatus and the secondary memory apparatus during the initial copy, it is necessary to prepare a broadband communication network even in a low-load I/O (Input/Output) processing environment, and this led to a wasteful business investment.

Moreover, for users under a contract of paying a traffic charge for the communication network (communication line) connecting the primary memory apparatus and the secondary memory apparatus, this will lead to a wasteful investment since users must pay a fee in accordance with the data traffic required for the initial copy.

In light of the above, a method has been proposed to reduce the data traffic between sites as much as possible during the initial copy. Specifically, with this method, a snapshot is created between a copy source logical device and an intermediate logical device in a memory apparatus at a first site (primary site), the pair status of the snapshot is thereafter separated, a logical device corresponding to the intermediate logical device is subsequently formed in an external memory apparatus (portable memory medium), the external memory apparatus is transported to a second site (secondary site) using a transportation means, the logical device formed in the external memory apparatus is registered in the memory apparatus at the second site, and only differential information that differs from the logical device formed in the external memory apparatus is thereafter copied from the memory apparatus at the first site to the memory apparatus at the second site via a global network (refer to Patent Document 1).

RELATED ART DOCUMENT

Patent Document 1

Japanese Patent Laid-Open Publication No. 2006-338250

DISCLOSURE OF THE INVENTION

In the future, it is possible that needs of an initial copy solution capable of reducing the data traffic among a plurality of sites will increase. Nevertheless, with the method described in Patent Document 1, in order to recognize the logical device of the external memory apparatus, it is necessary to set an intermediate logical device as the virtual logical device, and once copy the copy target data of the logical device (copy source logical device) in the memory apparatus to the intermediate logical device. In addition, it is also necessary to subsequently perform the operation of separating the copy source logical device and the intermediate logical device in order to prevent the copy target data of the intermediate logical device from becoming updated. Thus, the method described in Patent Document 1 is unable to sufficiently shorten the time required for performing the initial copy.

The present invention was devised in view of the problems encountered in the conventional technology described above. Thus, an object of the present invention is to provide a storage system and its initial copy method capable of reducing the processing required for the initial copy.

In order to achieve the foregoing object, the present invention is characterized in that a primary site issues a pair creation command to a secondary site prior to copying data of a primary volume of the primary site to a secondary volume of the secondary site, commands the copying of data that was updated after the pair creation command was issued, and responds to a backup request and outputs data of the primary volume as backup data to the backup requestor. Meanwhile, the secondary site responds to the pair creation command from the primary site and sets the entire initial copy target area of the secondary volume to an unwritten status, thereafter writes the update data updated at the primary site as differential information into the secondary volume, and, if data from an external memory medium is input, copies only unwritten data among such data to the secondary volume, and thereafter completes the initial copy on the condition that all differential information is copied to the secondary volume; that is, on the condition that there is no remaining unwritten data.

According to the present invention, it is possible to reduce the processing required for the initial copy.

BRIEF DESCRIPTION OF THE DRAWINGS

FIG. 9 is a diagram showing a display example of a pair creation command line;

BEST MODE FOR CARRYING OUT THE INVENTION

Figure 1:
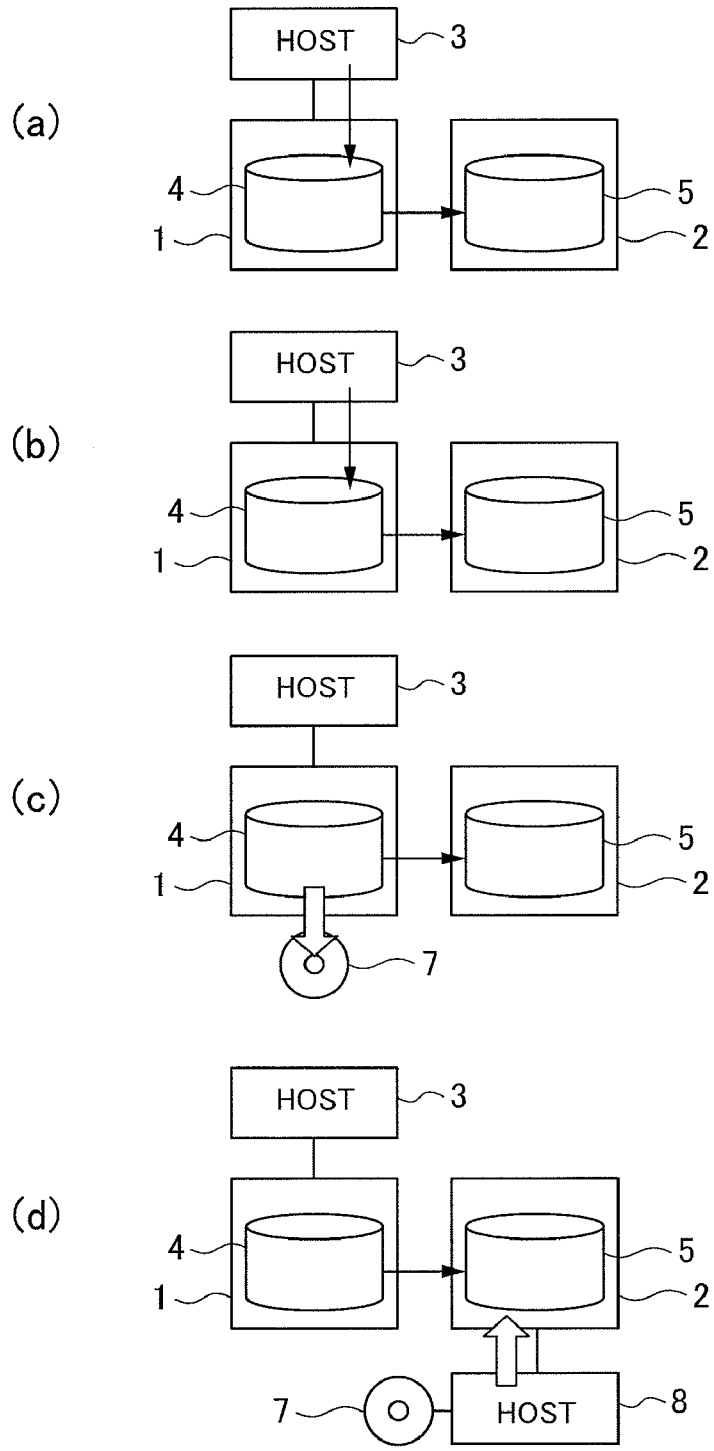
FIG. 1A to FIG. 1D are conceptual diagrams explaining the operational procedure of the storage system according to the present invention.

Embodiments of the present invention are now explained with reference to the attached drawings. FIG. 1A to 1D are conceptual diagrams explaining the operational procedure of a storage system according to the present invention. FIG. 1A shows a storage system comprising a primary site 1 including a disk array device, and a secondary site 2 including another disk array device. The primary site 1 is used for storing a data group to be used by a host computer 3 in a primary volume 4. The secondary site 2 is used as a backup of the primary site 1, and is used for storing a data group of the primary volume 4 in a secondary volume 5.

The host computer 3 functions as a server, and is able to access the primary site 1 and the secondary site 2, respectively. The primary site 1 and the secondary site 2 are connected via a communication network (not shown).

Figure 2:
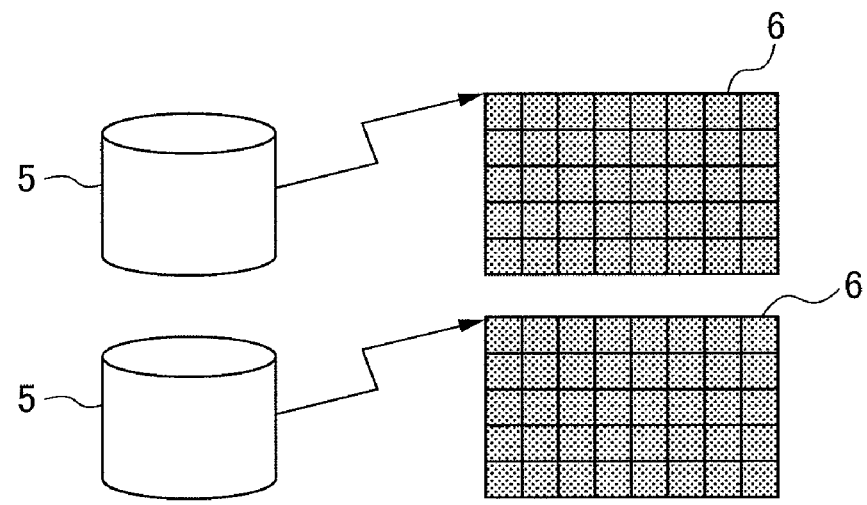
FIG. 2 is a diagram explaining the status of a secondary volume during pair creation.

Here, the present invention causes the host computer 3 to issue a pair creation command to the primary site 1 prior to copying data of the primary volume 4 to the secondary volume 5. In response to the pair creation command from the host computer 3, the primary site 1 issues a pair creation command to the secondary site 2. When the secondary site 2 inputs the pair creation command from the primary site 1, as shown in FIG. 2, it sets bits of the entire area of bitmap information 6 provided in units of I/O (Input/Output) processing for each secondary volume 5 to an unwritten status; for instance, it sets each bit to an ON state.

Subsequently, as shown in FIG. 1B, if update I/O processing is input from the host computer 3 after sending the pair creation command to the secondary site 2, the primary site 1 sends the update data that was updated pursuant to the update I/O processing to the secondary site 2.

Figure 3:
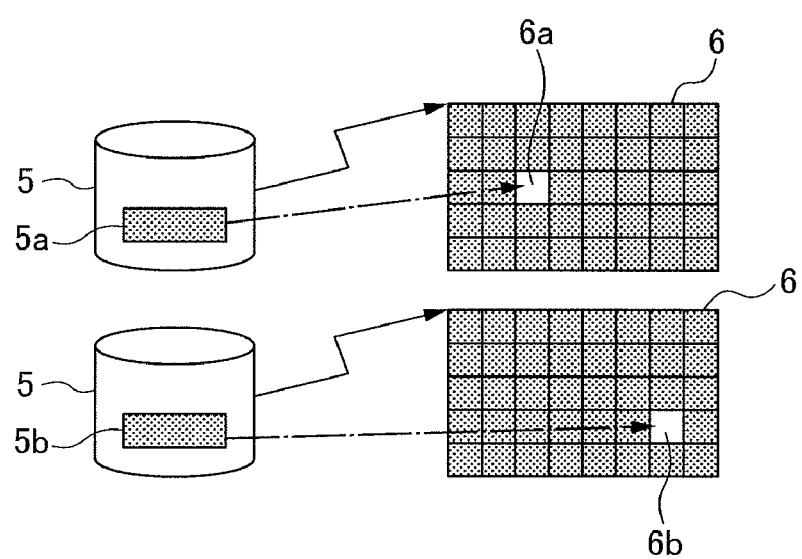
FIG. 3 is a diagram explaining the status upon writing data from a primary site into a secondary volume after the pair creation.

In the foregoing case, as shown in FIG. 3, the secondary site 2 respectively writes, as a copy mode, the update data 5a, 5b sent from the primary site 1 into a designated area of the secondary volume 5. Here, the secondary site 2 sets the bits corresponding to write locations 6a, 6b of the update data 5a, 5b among the bitmap information 6 to a written status, or an OFF state.

Subsequently, as shown in FIG. 1C, when a backup request is sent from the host computer 3 to the primary site 1, the primary site 1 backs up data of the primary volume 4 to an external medium (portable memory medium) 7. In the foregoing case, it is also possible to send data of the primary volume 4 as backup data to the host computer 3, and cause the host computer 3 to back up data of the primary volume 4 to the external medium 7. A transportation means such as a vehicle is used to thereafter transport the external memory medium 7 to the secondary site 2.

Subsequently, as shown in FIG. 1D, when a command for restoring data is input to the secondary site 2 from a host computer 8 or a maintenance terminal (not shown) managing that secondary site 2, the secondary site 2 restores the data recorded in the external memory medium 7 to the secondary volume 5. Here, the secondary site 2 switches the mode from a copy mode to a restoration mode, and writes the data of the external memory medium 7 into the secondary volume 5.

Figure 4:
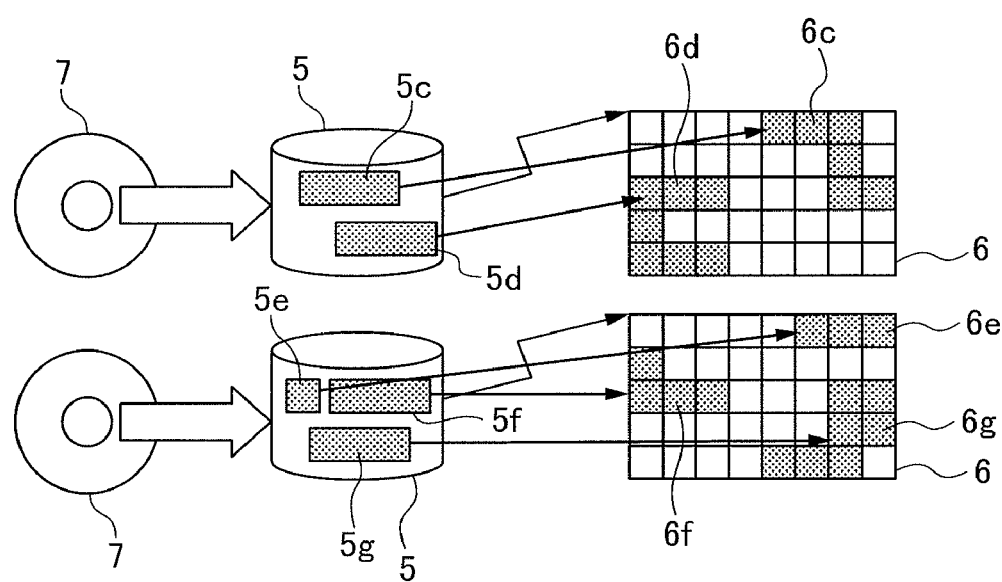
FIG. 4 is a diagram explaining the status upon restoring data of an external memory medium to a secondary volume.

In the foregoing case, as shown in FIG. 4, the secondary site 2 copies only the bits of the unwritten areas 6c, 6d, 6e, 6f, 6g among the bitmap information 6 according to the update data 5c, 5d, 5e, 5f, 5g as the write processing in the restoration mode.

Subsequently, after the writing of data is complete, the secondary site 2 sets the bits among the bitmap information 6 to which the update data has been copied to a written status Subsequently, the secondary site 2 cancels the restoration mode. On the condition that all bits of the bitmap information 6 have been written, the primary site 1 and the secondary site 2 mutually become a pair status.

Consequently, the initial copy of copying data of the primary volume 4 to the secondary volume 5 is complete. Here, remote copy can be implemented without having to suspend the primary site 1 and the secondary site 2.

EMBODIMENTS

Figure 5:
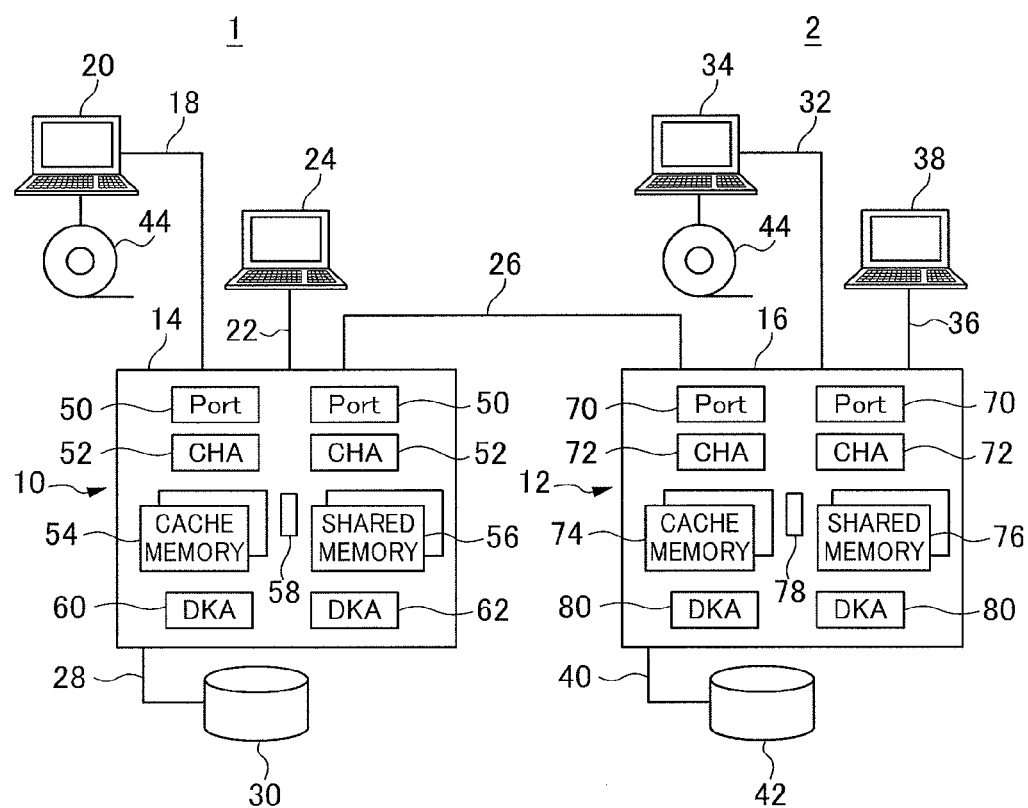
FIG. 5 is a block configuration diagram of the storage system showing an embodiment of the present invention.

An embodiment of the present invention is now explained with reference to the attached drawings. FIG. 5 is a block configuration diagram of a storage system showing an embodiment of the present invention. In FIG. 1, the primary site 1 and the secondary site 2 configuring the storage system are respectively provided with a primary disk subsystem 10 and a secondary disk subsystem 12. The primary disk subsystem 10 comprises a primary disk array device 14 as a storage controller, and the secondary disk subsystem 12 comprises a secondary disk array device 16 as a storage controller.

The primary disk array device 14 is connected to a primary site host computer 20 via a communication network 18, connected to a maintenance terminal 24 via a communication network 22, connected to a secondary disk array device 16 via a communication network (primary site/secondary site interface cable) 26, and connected to a primary disk drive 30 via a communication network 28.

The secondary disk array device 16 is connected to a secondary site host computer 34 via a communication network 32, connected to a maintenance terminal 38 via a communication network 36, and connected to a secondary disk drive 42 via a communication network 40.

The communication networks 18, 22, 26, 28, 32, 36, 40 are configured from a communication medium such as a LAN (Local Area Network), SAN (Storage Area Network), Internet or dedicated line.

If LAN is used as the communication network, the data transfer between the host computer 20 and the primary disk array device 14 and between the host computer 34 and the secondary disk array device 16 is performed via TCP/IP. If SAN is used as the communication network, the data transfer between the host computers 20, 34 and the respective disk array devices 14, 16 is performed according to a fibre channel protocol. Incidentally, the host computers 20, 34 are configured to be connectable to an external memory medium 44. The external memory medium 44 is configured portably as a portable memory medium such as a semiconductor memory or a tape.

The host computers 20, 34 are realized, for instance, with a server, personal computer, workstation, mainframe system, open system or the like. For example, if the host computers 20, 34 are connected to a plurality of client terminals via another communication network (none of these are shown), the host computers 20, 34 are able to provide services to the respective client terminals by reading and writing data from and into the respective disk array devices 14, 16 according to the request from the respective client terminals.

The primary disk array device 14 comprises a plurality of channel ports 50, a plurality of channel adapters (primary channel adapters) 52, a plurality of cache memories 54, a plurality of shared memories 56, a switch unit 58, and a plurality of disk adapters (primary disk adapters) 60.

Each channel adapter 52 is connected to the communication networks 18, 22, 26 via each channel port 50, and each disk adapter 60 is connected to the communication network 28. In addition, each channel adapter 52, each cache memory 54 and each shared memory 56, and each disk adapter 60 are mutually connected via the switch unit 58.

Each channel adapter 52 and each disk adapter 60 comprise, for example, a print substrate mounted with a microprocessor, a memory and the like, and a control program stored in the memory, and are able to realize prescribed functions through coordination of the foregoing hardware and software.

For instance, the channel adapter 52 connected to the host computer 20 is used for controlling the transfer of data between the host computer 20 and the primary disk array device 14, and is configured from an open channel adapter or a mainframe channel adapter.

The channel adapter 52 connected to the host computer 20 receives from the host computer 20 commands for reading and writing data as well as the target data, and operates according to the received command and data. Here, when the channel adapter 52 receives a read command from the host computer 20, it stores the read command in the shared memory 56.

At this time, the disk adapter 60 is constantly referring to the shared memory 56, and, if any unprocessed read command exists in the shared memory 56, the disk adapter 60 reads designated data from the disk drive 30 according to the read command and stores such data in the cache memory 54. The channel adapter 52 thereafter reads the data stored in the cache memory 54 and sends the read data to the host computer 20.

If the channel adapter 52 receives a write command from the host computer 20, it stores the write command in the shared memory 56. After the channel adapter 52 stores the data in the cache memory 54, it sends a write completion report to the host computer 20. At this time, the disk adapter 60 reads the data stored in the cache memory 54 according to the write command stored in the shared memory 56, and stores the read data in a designated storage area of the disk drive 30.

Each disk adapter 60 controls the data communication with the disk drive 30 and constantly monitors the status of the disk drive 30, and sends the monitoring result to the maintenance terminal 24 via an internal network (not shown).

The cache memory 54 is used for storing user data and the like, and is configured, for instance, from a nonvolatile memory.

The shared memory (or control memory) 56 is configured, for instance, from a nonvolatile memory. The shared memory 56 stores, for example, control information, management information, a pair information management table and a primary/secondary communication parameter table.

The switch unit 58 is used for mutually connecting the respective channel adapters 52, the respective cache memories 54, the respective shared memories 56, and the respective disk adapters 60, and is configured, for example, from an ultrafast crossbar switch. Consequently, all channel adapters 52 and disk adapters 60 are able to respectively access each cache memory 54 and each shared memory 56 via the switch unit 58.

The disk drive 30 is configured, as a memory apparatus, from a physical storage device such as a hard disk drive (HDD), a semiconductor memory, or an optical disk. The disk drive 30 may be configured from a plurality of disk drives, and a RAID (Redundant Array of Inexpensive Disks) group as a virtual logical area may be created on a physical storage area provided by the respective disk drives 30. One or more virtual logical devices (LU: Logical Units) may be set in the RAID group. Here, the disk drive 30 functions as a primary logical device or a primary volume (primary data volume).

The secondary disk array device 16 comprises a plurality of channel ports 70, a plurality of channel adapters (secondary channel adapters) 72, a plurality of cache memories 74, a plurality of shared memories 76, a switch unit 78, and a plurality of disk adapters (secondary disk adapters) 80.

Each channel adapter 72 is connected to the communication networks 26, 32, 36 via each channel port 70, and each disk adapter 80 is connected to the communication network 40. Moreover, each channel adapter 72, each cache memory 74 and each shared memory 76, and each disk adapter 80 are mutually connected via the switch unit 78.

Each channel adapter 72 and each disk adapter 80 comprise, for example, a print substrate mounted with a microprocessor, a memory and the like, and a control program stored in the memory, and are able to realize prescribed functions through coordination of the foregoing hardware and software.

For instance, the channel adapter 72 connected to the host computer 34 is used for controlling the data transfer between the host computer 34 and the secondary disk array device 16, and is configured as an open channel adapter or a mainframe channel adapter.

Moreover, the channel adapter 72 connected to the channel adapter 52 of the primary site 1 receives from the channel adapter 52 commands and data for pair creation via the communication network 26, and operates according to the received command and data. Here, when the channel adapter 72 receives a read command from the channel adapter 52, it stores the read command in the shared memory 76.

At this time, the disk adapter 80 is constantly referring to the shared memory 76, and, if any unprocessed read command exists in the shared memory 76, the disk adapter 80 reads designated data from the disk drive 42 according to the read command and stores such data in the cache memory 74. The channel adapter 72 thereafter reads the data stored in the cache memory 74 and sends the read data to the channel adapter 52.

If the channel adapter 72 receives a write command from the channel adapter 52, it stores the write command in the shared memory 76. After the channel adapter 72 stores the data in the cache memory 74, it sends a write completion report to the channel adapter 52. At this time, the disk adapter 80 reads the data stored in the cache memory 74 according to the write command stored in the shared memory 76, and stores the read data in a designated storage area of the disk drive 42.

Each disk adapter 80 controls the data communication with the disk drive 42 and constantly monitors the status of the disk drive 42, and sends the monitoring result to the maintenance terminal 38 via an internal network (not shown).

The cache memory 74 is used for storing user data and the like, and is configured, for instance, from a nonvolatile memory.

The shared memory (or control memory) 76 is configured, for instance, from a nonvolatile memory. The shared memory 76 stores, for example, control information, management information, a pair information management table and a primary/secondary communication parameter table.

The switch unit 78 is used for mutually connecting the respective channel adapters 72, the respective cache memories 74, the respective shared memories 76, and the respective disk adapters 80, and is configured, for example, from an ultrafast crossbar switch. Consequently, all channel adapters 72 and disk adapters 80 are able to respectively access each cache memory 74 and each shared memory 76 via the switch unit 78.

The disk drive 42 is configured, as a memory apparatus, from a physical storage device such as a hard disk drive (HDD), a semiconductor memory, or an optical disk. The disk drive 42 may be configured from a plurality of disk drives, and a RAID (Redundant Array of Inexpensive Disks) group as a virtual logical area may be created on a physical storage area provided by the respective disk drives 42. One or more virtual logical devices (LU: Logical Units) may be set in the RAID group. Here, the disk drive 42 functions as a secondary logical device or a secondary volume (secondary data volume).

Incidentally, a virtual logical area is referred to as a logical volume or a logical device (LDEV) in a mainframe system, and referred to as a logical unit (LU) in an open system. Thus, the wording of "primary volume" and "secondary volume" used in the claims is an appellation that covers the terms of logical volume, logical device and logical unit.

A pair information management table T1 among the various types of information stored in the shared memories 56, 76 is provided for each logical device or volume.

Figure 6:
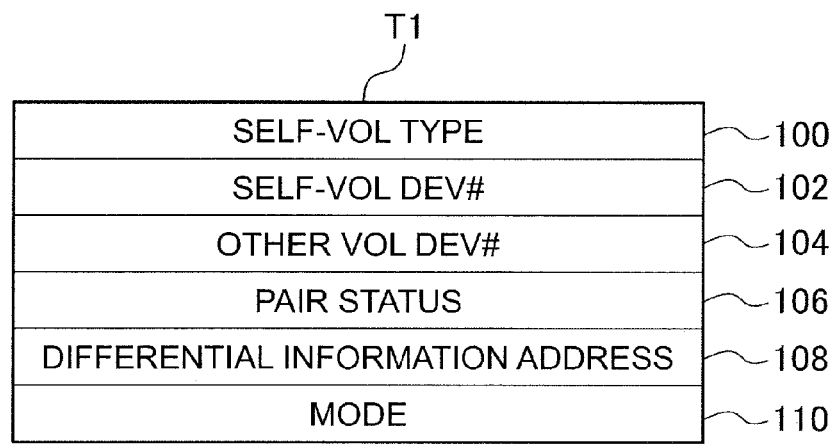
FIG. 6 is a configuration diagram of a pair information management table.

Each pair information management table T1 stored in the shared memories 56, 76 stores, as shown in FIG. 6, information concerning the self-volume type 100, self-volume device number 102, other volume device number 104, pair status 106, differential information address 108, and mode 110.

In the case of the pair information management table T1 of the shared memory 56, the self-volume type 100 stores the data of "00" as the self-volume since the disk drive 30 corresponds to a primary volume. In the case of the pair information management table T1 of the shared memory 76, the self-volume type 100 stores the data of "01" as the self-volume since the disk drive 42 corresponds to a secondary volume. The self-volume device number 102 stores the number of the disk drive 30.

The self-volume device number 102 stores the number of the disk drive 30 in the case of the pair information management table T1 of the shared memory 56. The other volume device number 104 stores the number of the disk drive 42 as the other volume in the case of the pair information management table T1 of the shared memory 56.

The pair status 106 stores, in both pair information management tables T1, the data of "00" if the pair status is Simplex (status where copying between the primary and secondary volumes has not yet been started), the data of "01" if the pair status is Copy, the data of "02" if the pair status is Suspend, and the data of "03" if the pair status is Pair. The differential information address 108 stores the address of the differential information (bitmap information) only in the case of the pair information management table T1 of the shared memory 76.

The mode 110 stores, in both pair information management tables T1, the data of "00" as the default value, stores the data of "01" during the minimum copy mode, and stores the data of "02" during the restoration mode. Incidentally, information concerning the pair management table T1 may also be stored in the memory of the channel adapter 52 or the disk adapter 60.

Figure 7:
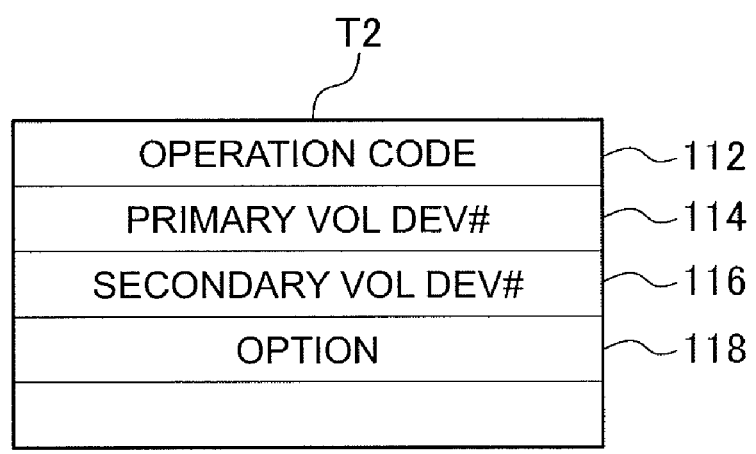
FIG. 7 is a configuration diagram of a primary/secondary communication parameter table.

Moreover, the primary/secondary communication parameter table T2 stored in the shared memories 56, 76 is configured, as shown in FIG. 7, from an operation code 112, a primary volume device number 114, a secondary volume device number 116, and an option 118.

The operation code 112 stores the data of "00" if the status is pair creation, stores the data of "01" if the status is Suspend, stores the data of "02" if the status is Resync, and stores the data of "03" if the status is pair deletion. The primary volume device number 114 stores the number of the disk drive 30, and the secondary volume device number 116 stores the number of the disk drive 42. The option 118 stores the data of "00" if there is no option, and stores the data of "01" if the mode is a minimum copy mode.

Figure 8:
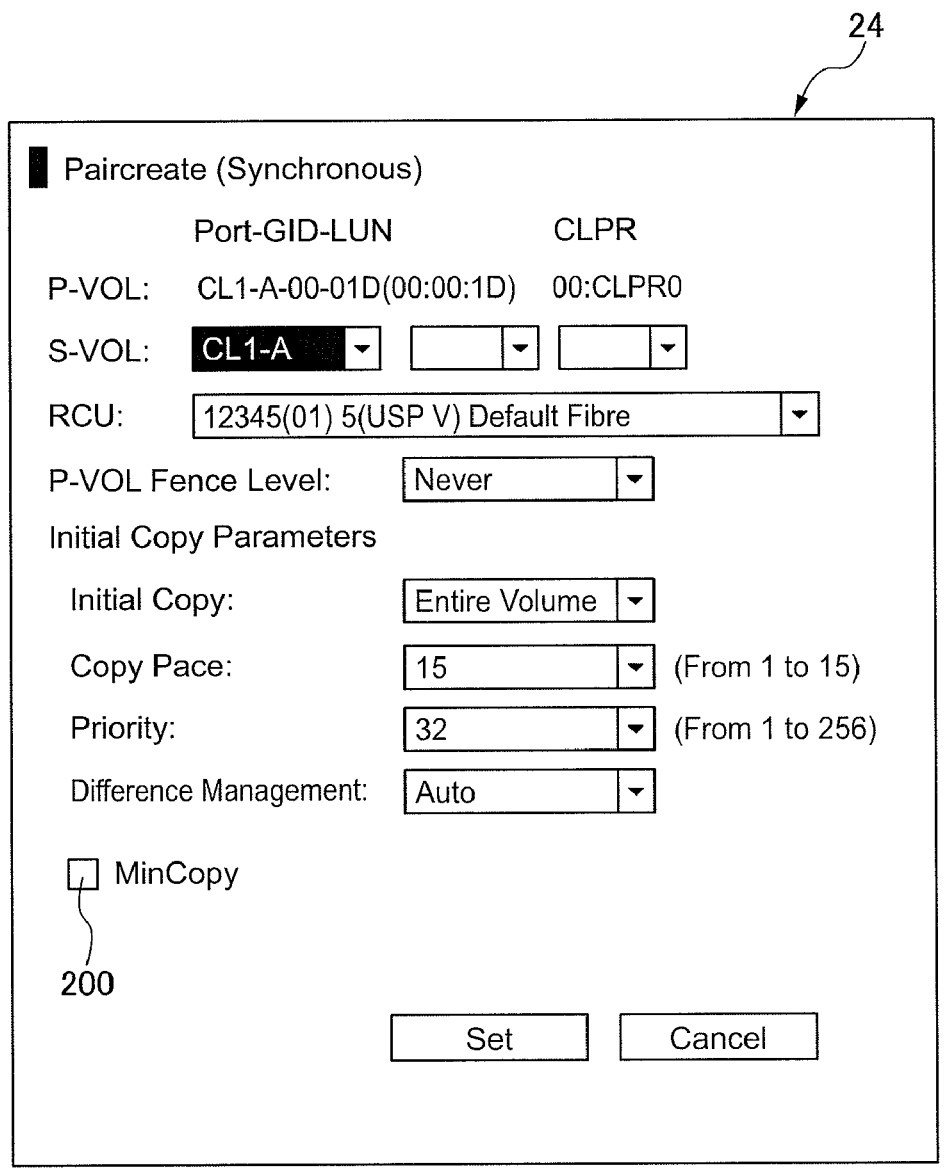
FIG. 8 is a diagram showing a display example of a pair creation screen.

The initial copy processing is now explained. Foremost, a pair creation screen as shown in FIG. 8 is displayed on a display screen of the maintenance terminal 24, and, if an operator selects a minimum copy 200, pair creation processing associated with such minimum copy (Min Copy) is started.

Figure 9:
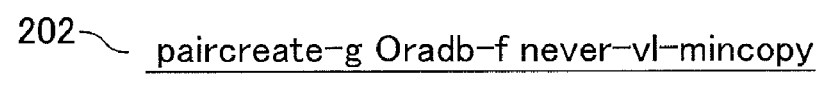

Moreover, as shown in FIG. 9, a pair creation command line 202 is displayed on a screen of the host computer 20 based on the operator's operation, and the pair creation processing associated with the minimum copy is also started when a command concerning the displayed pair creation command line 202 is input to the primary disk array device 14.

Here, minimum copy (Min Copy) is a copying process included in the remote copy, and refers to the copying where a pair is formed between the primary and secondary volumes, and, after the entire initial copy target area of the secondary volume is set to an unwritten status, data of the primary volume is copied to the secondary volume.

Figure 10:
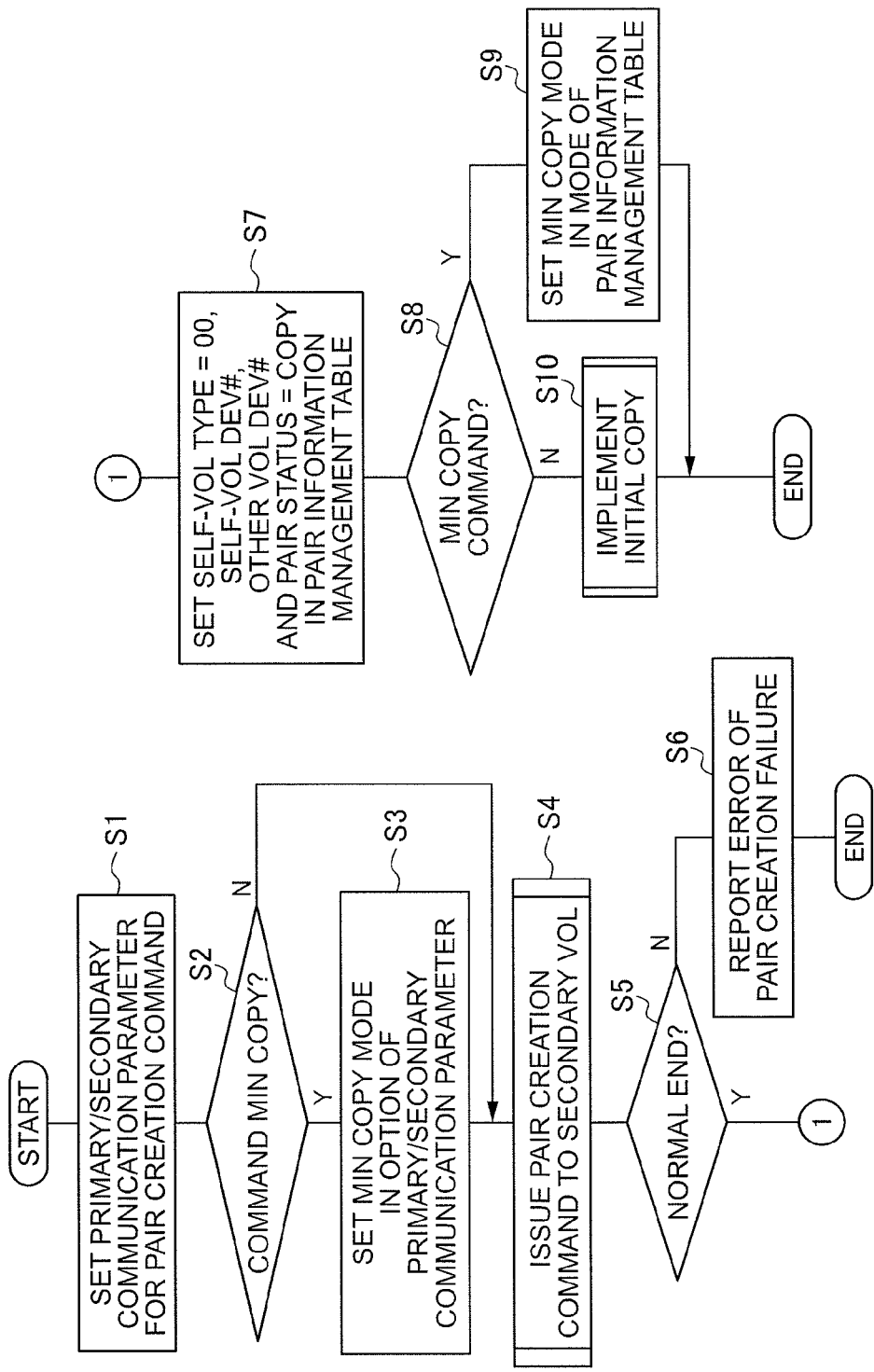
FIG. 10 is a flowchart explaining the processing of the primary site during pair creation.

When the pair creation processing associated with the minimum copy is started, as processing in the primary site 1, the pair creation processing associated with the minimum copy as shown in FIG. 10 is executed.

In FIG. 10, foremost, the channel adapter 52 sets the data of "00" as the pair creation in the operation code 112 of the primary/secondary communication parameter table T2 based on the command (S1), subsequently determines whether a minimum copy command has been issued (S2), and, if a minimum copy command has been issued, sets "01" as the minimum copy mode in the option 118 of the primary/secondary communication parameter table T2 (S3).

Subsequently, the channel adapter 52 outputs a pair creation command to the secondary disk array device 16 for forming a pair with the secondary volume (S4), determines whether the pair creation command ended normally (S5), reports an error of pair creation failure to the maintenance terminal 24 or the host computer 20 if the pair creation command did not end normally (S6), and then ends this processing routine.

Meanwhile, if it is determined that the pair creation command did not end normally at step S5, the channel adapter 52 sets "00" in the self-volume type 100 of the pair information management table T1, sets the number of the disk drive 30 in the self-volume device number 102, sets the number of the disk drive 42 in the other volume device number 104, and sets "01" representing Copy in the pair status 106 (S7).

The channel adapter 52 thereafter determines whether a minimum copy command was issued to the secondary site 2 (S8), and, if a minimum copy command has been issued, sets "01" as the minimum copy mode in the mode 110 of the pair information management table T1 (S9), and then ends this processing routine. Meanwhile, if a minimum copy command has not been issued, the channel adapter 52 implements initial copy (S10), and then ends this processing routine.

Meanwhile, the channel adapter 72 in the secondary site 2 executes the minimum copy pair creation processing as the processing in the secondary site 2.

Figure 11:
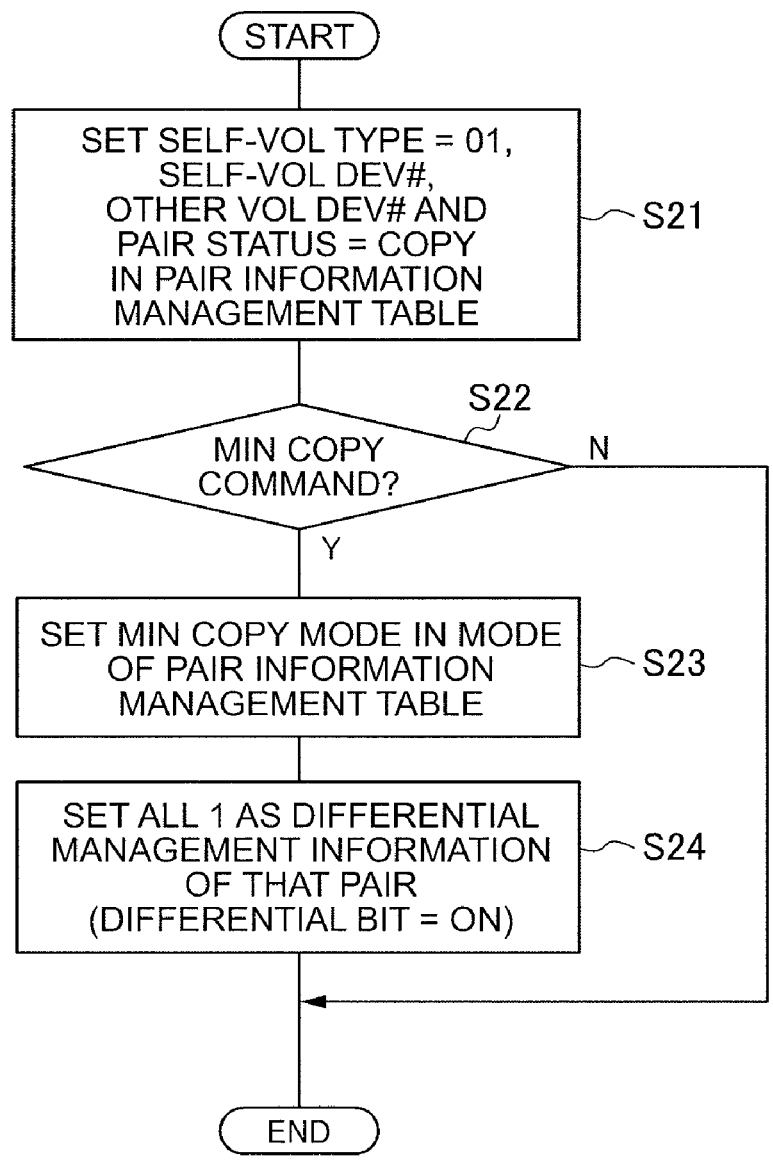
FIG. 11 is a flowchart explaining the processing of the secondary site during pair creation.

Specifically, as shown in FIG. 11, the channel adapter 72 responds to the pair creation command from the channel adapter 52 and sets "01" as data showing the secondary volume in the self-volume type 100 of the pair creation management table T1, sets the number of the disk device 42 in the self-volume device number 102, sets the number of the disk drive 30 in the other volume device number 104, and sets "01" as data showing Copy in the pair status 106.

The channel adapter 72 thereafter determines whether the command is a minimum copy command (S22), and, if it is not a minimum copy command, ends this processing routine. Meanwhile, if it is a minimum copy command, the channel adapter 72 sets "01" as the minimum copy mode in the mode 110 of the pair information management table T1 (S23), sets all bits of the bitmap information as differential information concerning the pair between the disk drive 30 of the primary volume and the disk drive 42 of the secondary volume to an unwritten status (bits ON) (S24), and then ends this processing routine.

When the I/O processing is thereafter executed in the primary site 1 according to the I/O request from the host computer 20, data of the disk drive 30 is updated. When the data of the disk drive 30 is updated, the updated data is transferred from the channel adapter 52 to the secondary site 2, and the remote I/O processing is executed in the secondary site 2.

Figure 12:
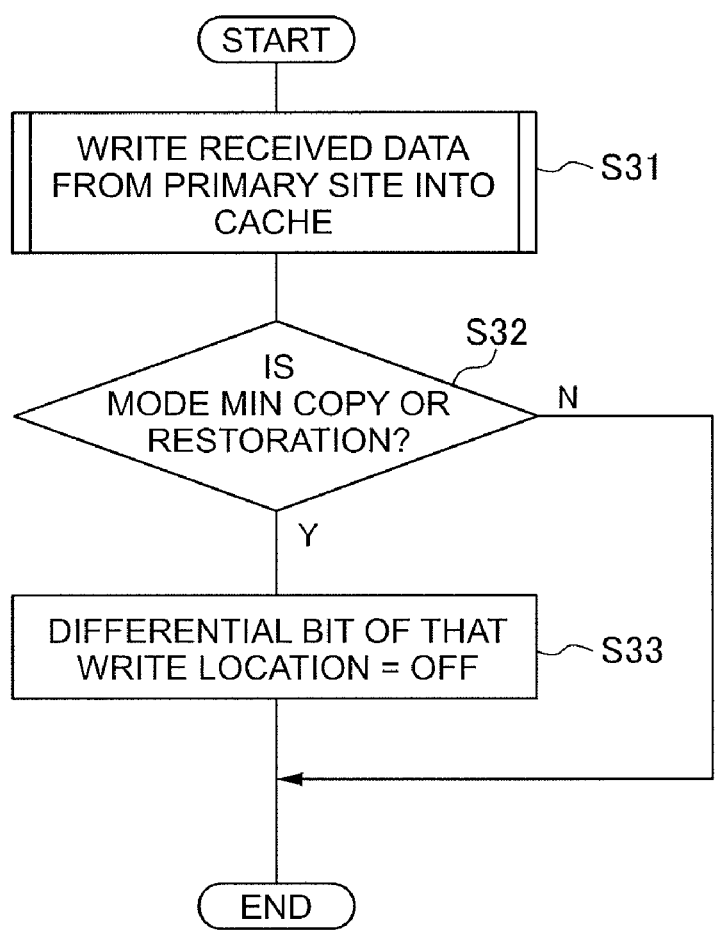
FIG. 12 is a flowchart explaining the remote I/O processing at the secondary site.

The remote I/O processing in the secondary site 2 is now explained with reference to the flowchart of FIG. 12. The remote I/O processing in the secondary site 2 is executed by the channel adapter 72 and the disk adapter 80.

Specifically, when the channel adapter 72 receives the updated data and the command from the primary site 1, it writes the received data into the cache memory 74 based on the received command (S31). Here, the disk adapter 80 determines whether minimum copy or restoration is currently being performed (S32), and, if it is determined that minimum copy is being performed, the disk adapter 80 performs processing for writing the update data into a designated storage location of the disk drive 42 (S33).

Incidentally, at step S32, the differential information (bitmap information) corresponding to the write location of the update data is set to a written status, or an OFF state. Moreover, if it is determined that restoration is being performed at step S32, the disk adapter 72 ends this processing routine without writing the update data from the primary site 1 into the disk drive 42.

Subsequently, in the course of the update data being sent from the primary site 1 to the secondary site 2, if a backup request from the host computer 20 is input to the primary site 1, the channel adapter 52 transfers the data stored in the disk drive 30 as backup data to the host computer 20 of the backup requestor. Consequently, the host computer 20 copies the backup data to the external memory medium 44, and backs up the data of the disk drive 30 as backup data to the external memory medium 44.

After the backup data is recorded therein, the external memory medium 44 is transported to the secondary site 2 with a transportation means such as a vehicle, and then connected to the host computer 34.

Figure 13:
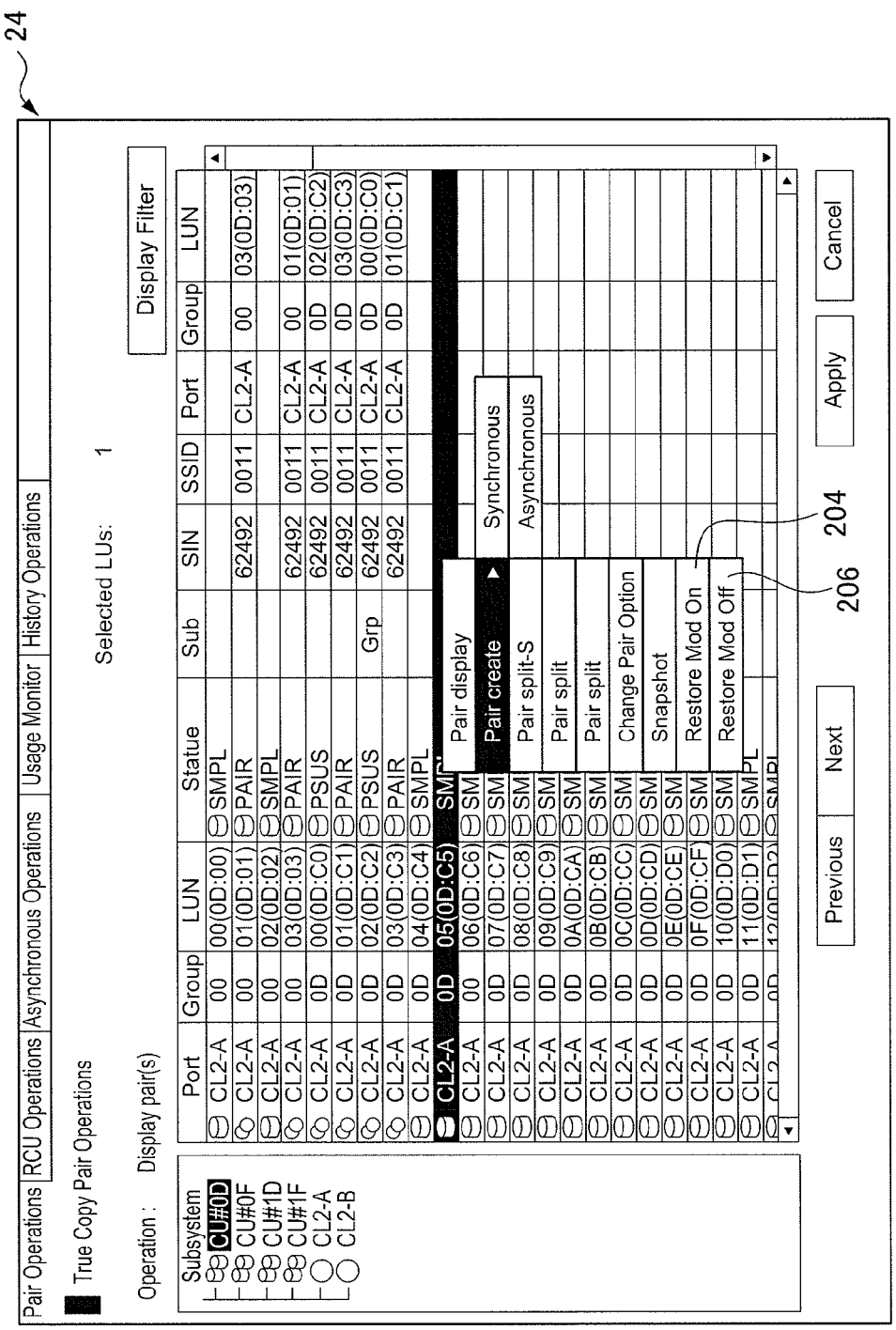
FIG. 13 is a diagram showing an example of a display screen upon switching to the restoration mode.

When the external memory medium 44 is connected to the host computer 34, if a restoration mode ON 204 is selected on the operation screen pursuant to a command from the host computer 34 or the maintenance terminal 24; for instance, by the operator of the maintenance terminal 24 as shown in FIG. 13, processing for switching the secondary site 2 from the minimum copy mode to the restoration mode is performed.

Figure 14:
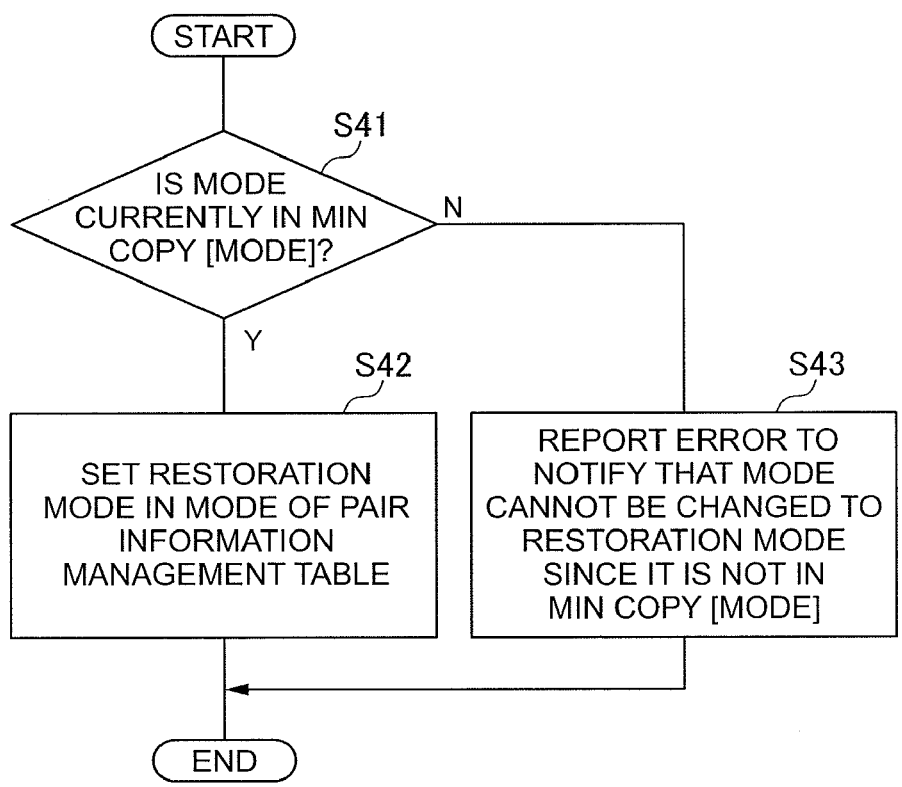
FIG. 14 is a flowchart explaining the restoration mode ON processing.

The restoration mode ON processing is now explained with reference to the flowchart of FIG. 14. Foremost, the channel adapter 72 responds to the command from the host computer 34 or the maintenance terminal 24 and determines whether the minimum copy is currently being performed (S41). If it is determined that the minimum copy is being performed, the channel adapter 72 sets "02" representing restoration in the mode 110 of the pair information management table T1 in order to shift from the minimum copy mode to the restoration mode, and then ends this processing routine (S42). If it is determined that the minimum copy is not being performed, since it is not possible to shift to the restoration mode, the channel adapter 72 reports an error to the host computer 34 or the maintenance terminal 24 (S43), and then ends this processing routine.

Figure 15:
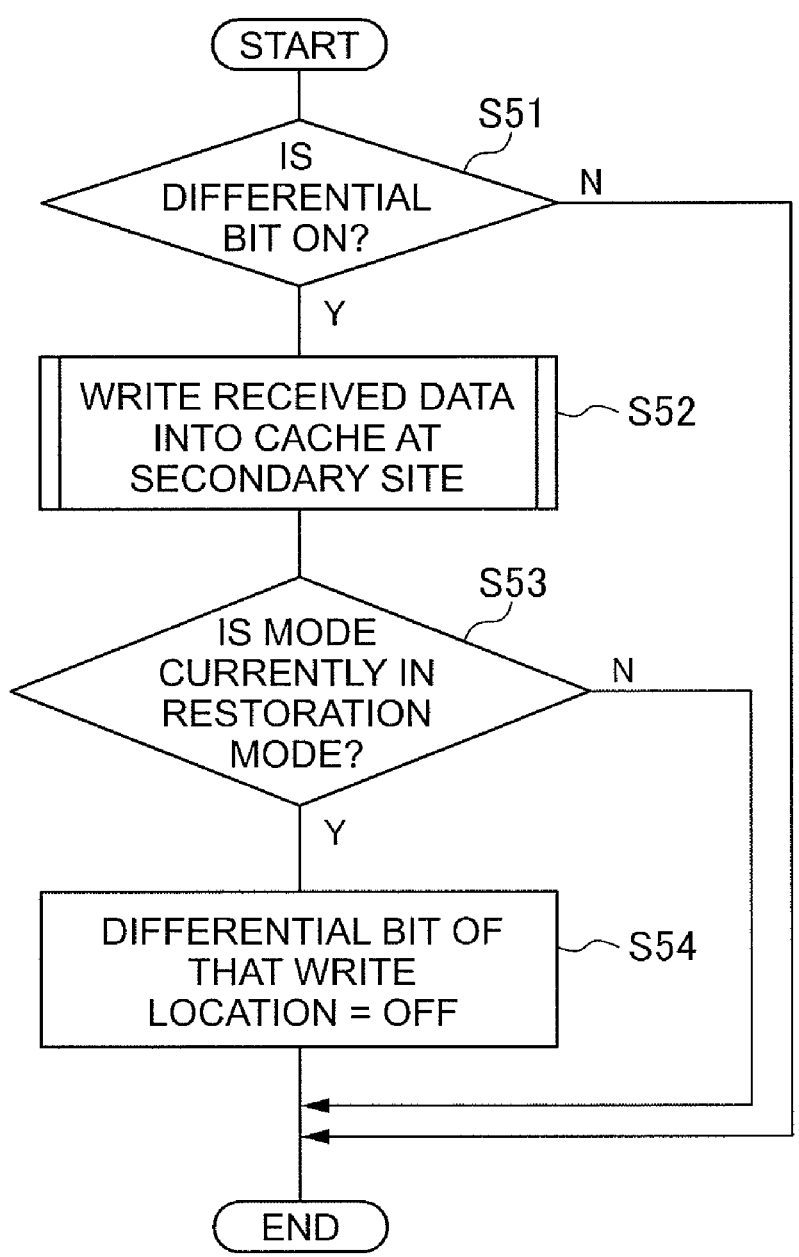
FIG. 15 is a flowchart explaining the restoration processing.

The restoration processing is now explained with reference to the flowchart of FIG. 15. Foremost, the channel adapter 72 imports the differential information (bitmap information), and determines whether the differential bits are ON (S51). If the differential bits are not ON, the channel adapter 72 ends this processing routine. Meanwhile, if the differential bits are ON, the channel adapter 72 writes the received data (update data) that was received in the secondary site 2 into the cache memory 74 (S52).

The channel adapter 72 thereafter determines whether the mode is currently in the restoration mode (S53). If the mode is not in the restoration mode, the channel adapter 72 ends this processing routine. Meanwhile, if the mode is in the restoration mode, the channel adapter 72 sets the bits as differential information at the write location to OFF based on the received data written into the cache memory 74 (S54), and then ends this processing routine.

Figure 16:
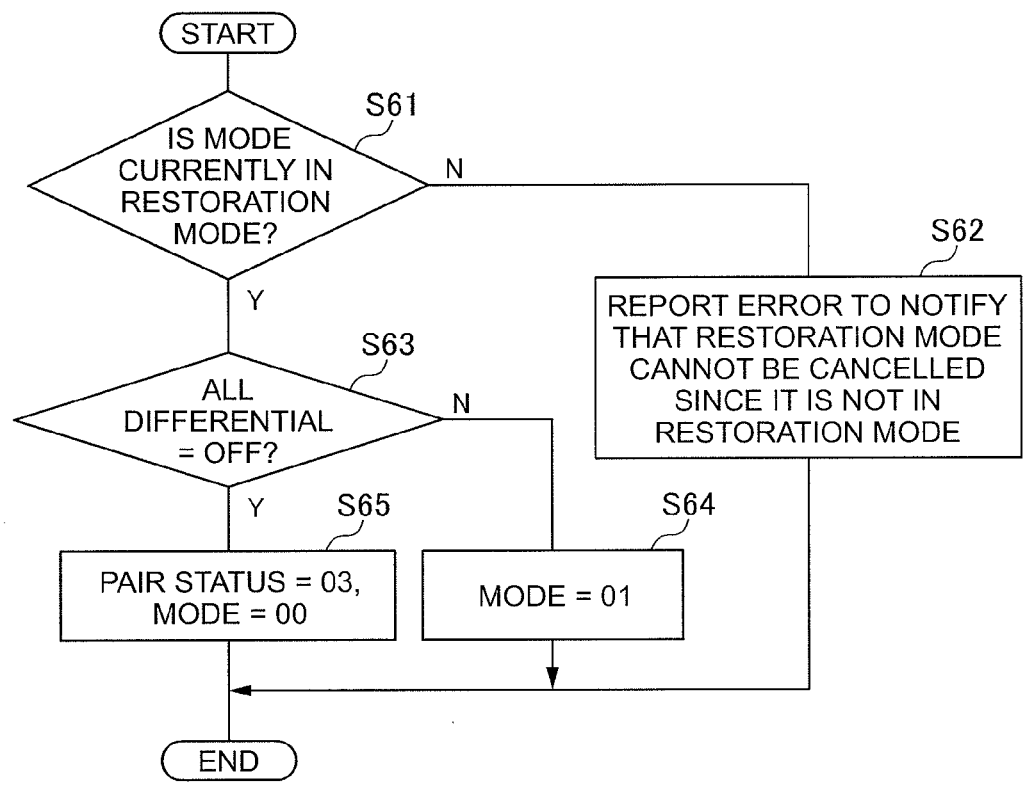
FIG. 16 is a flowchart explaining the restoration mode OFF processing.

The restoration mode OFF processing is now explained with reference to the flowchart of FIG. 16. The restoration mode OFF processing is started, as shown in FIG. 13, when the operator selects a restoration mode OFF 206 on the operation screen of the maintenance terminal 24.

Foremost, the channel adapter 72 determines whether the mode is currently in the restoration mode (S61). If it is determined that the mode is not in the restoration mode, the channel adapter 72 reports an error to the host computer 34 or the maintenance terminal 24 since it is not possible to cancel the restoration mode (S62), and then ends this processing routine.

Meanwhile, if it is determined that the mode is in the restoration mode, the channel adapter 72 determines whether the bits of all differential information (bitmap information) are OFF (S63). If all bits of the differential information are not OFF, the channel adapter 72 determines this to be a minimum copy mode and proceeds to the minimum copy processing (S64), and then ends this processing routine.

Meanwhile, if it is determined that all bits of the differential information (bitmap information) are OFF at step 63, the channel adapter 72 sets "03" as the pair status in the pair status 106 of the pair management table T1, sets "00" as the data showing the default value in the mode 110 (S65), and then ends this processing routine.

Subsequently, on the condition that all bits of the differential information are in an OFF state, the remote copy is complete.

Incidentally, information such as the control information, management information or pair information management table and primary/secondary communication parameter table may also be stored in the memory of the channel adapters 52, 72 or the memory of the disk adapters 60, 80, or stored in another dedicated memory.

In addition, in substitute for the microprocessor of the channel adapters 52, 72 and disk adapters 60, 80, a dedicated microprocessor may be provided to each disk array device 14, 16, and each microprocessor may be used as the controller to execute the processing related to the initial copy.

For example, a microprocessor comprising the functions of the microprocessor of the channel adapter 52 and the microprocessor of the disk adapter 60 may be used as the primary controller, and a microprocessor comprising the functions of the microprocessor of the channel adapter 72 and the microprocessor of the disk adapter 80 may be used as the secondary controller.

In the foregoing case, the primary controller issues a pair creation command to the secondary controller prior to remote-copying data of the primary volume to the secondary volume, commands the copying of the update data updated after the foregoing pair creation command was issued, and subsequently responds to the backup request from the backup requestor and outputs the data of the primary volume as backup data to the backup requestor.

In addition, the secondary controller responds to the pair creation command from the primary controller and sets the entire initial copy target area of the secondary volume to an unwritten status, and thereafter copies the update data updated by the primary controller as differential information to the initial copy target area of the secondary volume. After completing the copy of such differential information, if backup data is input as data from the external memory medium 44 recording the backup data, data among the foregoing backup data that is different from the differential information is written into the secondary volume.

Moreover, if the secondary controller receives from the primary controller a command for copying the update data, it copies the update data sent from the primary controller to the initial copy target area of the secondary volume, and sets the bits corresponding to the storage location of the update data among the differential information to an OFF state. If the secondary controller thereafter receives from the maintenance terminal 24 or the host computer 20 a command for restoring the backup data stored in the external memory medium 44 to the secondary volume 42, it copies the backup data to the areas within the initial copy target area of the secondary volume 42 where the bits of differential information are in an ON state, and sets the bits corresponding to the storage location of the backup data among the differential information to an OFF state.

Consequently, the primary controller and the secondary controller complete the remote copy on the condition that all bits of the differential information are in an OFF state.

According to the present embodiment, it is possible to reduce the processing required for the initial copy.

In addition, according to the present embodiment, it is also possible to reduce the data traffic associated with the initial copy, and reduce the traffic charge upon using the communication network.

The invention claimed is:

1. A storage system, comprising:
   a primary disk subsystem installed at a primary site; and
   a secondary disk subsystem installed at a secondary site and connected to the primary disk subsystem via a communication medium;
   wherein the primary disk subsystem includes a primary volume created from a plurality of disk devices, and a primary controller for controlling the primary volume and sending and receiving data to and from the secondary disk subsystem via the communication medium;
   wherein the secondary disk subsystem includes a secondary volume created from a plurality of disk devices, a secondary controller for controlling the volume and sending and receiving data to and from the primary disk subsystem via the communication medium, and differential information indicating a status of each of plurality of areas of the secondary volume;
   wherein the primary controller issues a pair creation command to the secondary controller with mode information indicating a copy mode of a remote copy between the primary volume and the secondary volume,
   wherein if the copy mode is a non-minimum copy mode according to the mode information, the storage system executes an initial copy process in which the primary controller, sends all data stored in the primary volume to the second disk subsystem via the communication medium and the second controller stores the received data in the second volume, and the storage system manages the primary volume and the secondary volume as a remote copy pair and executes control so that updated data in the primary volume is copied to the secondary volume via the communication medium,
   wherein if the copy mode is a minimum copy mode according to the mode information:
      the secondary controller sets the status of all of the plurality of areas of the secondary volume to an unwritten status instead of executing the initial copy process
      the storage system manages the primary volume and the secondary volume as a remote copy pair and executes control so that updated data in the primary volume is copied to the secondary volume via the communication medium;
      the second disk subsystem updates the differential information so that the status of an area corresponding to the updated data is changed from an unwritten status to an updated status; and
      the storage system copies data, which is not updated, from the primary volume to the secondary volume via an external without using the communication mediums based on the differential information.

2. The storage system according to claim 1,
   wherein the primary controller comprises a primary channel adapter for outputting a command to the secondary controller for the pair creation or the copying of the update data, and outputting data of the primary volume as backup data to a host computer of the backup requestor, and a primary disk adapter for controlling the primary volume;

wherein the secondary controller comprises a secondary channel adapter for inputting and processing commands and data from the primary channel adapter, and a secondary disk adapter for controlling the secondary volume; and wherein the secondary disk adapter sets the entire initial copy target area of the secondary volume to an unwritten status and sets all bits of differential information for managing information of the initial copy target area to an ON state when the secondary channel adapter receives a pair creation command from the primary channel adapter with the mode information indicating the minimum copy mode, thereafter copies the update data sent from the primary channel adapter to the initial copy target area of the secondary volume and sets bits corresponding to a storage location of the update data among the differential information to an OFF state when the secondary channel adapter receives a command for copying the update data from the primary channel adapter, subsequently copies the backup data to areas where bits of the differential information are in an ON state within the initial copy target area of the secondary volume and sets bits corresponding to a storage location of the backup data among the differential information to an OFF state when the secondary channel adapter receives a command for restoring the backup data stored in the external memory medium to the secondary volume, and thereby completes the remote copy on the condition that all bits of the differential information are in an OFF state.

3. The storage system according to claim 1,
wherein the primary controller outputs the pair creation command to the secondary controller according to a command from a maintenance terminal connected to a communication medium or a host computer connected to a communication medium.

4. The storage system according to claim 1,
wherein the secondary controller sets the entire initial copy target area of the secondary volume to an unwritten status and sets all bits of differential information for managing information of the initial copy target area to an ON state upon receiving the pair creation command from the primary controller with the mode information indicating the minimum copy mode.

5. The storage system according to claim 1,
wherein the secondary controller sets the entire initial copy target area of the secondary volume to an unwritten status and sets all bits of differential information for managing information of the initial copy target area to an ON state upon receiving the pair creation command from the primary controller with the mode information indicating the minimum copy mode, and thereafter copies the update data sent from the primary controller to the initial copy target area of the secondary volume and sets bits corresponding to a storage location of the update data among the differential information to an OFF state upon receiving a command for copying the update data from the primary controller.

6. The storage system according to claim 1,
wherein the secondary controller sets the entire initial copy target area of the secondary volume to an unwritten status and sets all bits of differential information for managing information of the initial copy target area to an ON state upon receiving the pair creation command from the primary controller with the mode information indicating the minimum copy mode, thereafter copies the update data sent from the primary controller to the initial copy target area of the secondary volume and sets bits corresponding to a storage location of the update data among the differential information to an OFF state upon receiving a command for copying the update data from the primary controller, and subsequently copies the backup data to areas where bits of the differential information are in an ON state within the initial copy target area of the secondary volume and sets bits corresponding to a storage location of the backup data among the differential information to an OFF state upon receiving a command for restoring backup data stored in the external memory medium to the secondary volume from a maintenance terminal connected to a communication medium or a host computer connected to a communication medium.

7. The storage system according to claim 1,
wherein the secondary controller sets the entire initial copy target area of the secondary volume to an unwritten status and sets all bits of differential information for managing information of the initial copy target area to an ON state upon receiving the pair creation command from the primary controller with the mode information indicating the minimum copy mode, thereafter copies the update data sent from the primary controller to the initial copy target area of the secondary volume and sets bits corresponding to a storage location of the update data among the differential information to an OFF state upon receiving a command for copying the update data from the primary controller, and subsequently copies the backup data to areas where bits of the differential information are in an ON state within the initial copy target area of the secondary volume and sets bits corresponding to a storage location of the backup data among the differential information to an OFF state upon receiving a command for restoring backup data stored in the external memory medium to the secondary volume from a maintenance terminal connected to a communication medium or a host computer connected to a communication medium; and wherein the primary controller and the secondary controller thereby complete the remote copy on the condition that all bits of the differential information are in an OFF state.

8. An initial copy method of a storage system comprising a primary disk subsystem installed at a primary site, and a secondary disk subsystem installed at a secondary site and connected to the primary disk subsystem via a communication medium;

wherein the primary disk subsystem includes a primary volume created from a plurality of disk devices, and a primary controller for controlling the primary volume and sending and receiving data to and from the secondary disk subsystem via the communication medium;

wherein the secondary disk subsystem includes a secondary volume created from a plurality of disk devices, a secondary controller for controlling the volume and sending and receiving data to and from the primary disk subsystem via the communication medium, and differential information indicating a status of each of a plurality of areas of the secondary volume;

wherein the primary controller executes:

a step of issuing a pair creation command to the secondary controller with mode information indicating a copy mode of a remote copy between the primary volume and the secondary volume, wherein if the copy mode is a non-minimum copy mode according to the mode information, the storage system executes an initial copy process in which the primary controller sends all data stored in the primary volume to the second disk subsystem via the communication medium and the second controller stores the received data in the second volume, and the storage system manages the primary volume and the secondary volume as a remote copy pair and executes control so that updated data in the primary volume is copied to the secondary volume via the communication medium, wherein if the copy mode is a minimum copy mode according to the mode information:

the secondary controller sets the status of all of the plurality of areas of the secondary volume to an unwritten status instead of executing the initial copy process, the storage system manages the primary volume and the secondary volume as a remote copy pair and executes control so that updated data in the primary volume is copied to the secondary volume via the communication medium, the second disk subsystem updates the differential information so that the status of an area corresponding to the updated data is changed from an unwritten status to an updated status, and the storage system copies data, which is not updated, from the primary volume to the secondary volume via an external without using the communication mediums based on the differential information.

9. The initial copy method of a storage system according to claim 8, wherein the secondary controller executes:

a step of setting the entire initial copy target area of the secondary volume to an unwritten status and setting all bits of differential information for managing information of the initial copy target area to an ON state upon receiving the pair creation command from the primary controller with the mode information indicating the minimum copy mode;

a step of thereafter copying the update data sent from the primary controller to the initial copy target area of the secondary volume and setting bits corresponding to a storage location of the update data among the differential information to an OFF state upon receiving a command for copying the update data from the primary controller; and a step of subsequently copying the backup data to areas where bits of the differential information are in an ON state within the initial copy target area of the secondary volume and setting a bit corresponding to a storage location of the backup data among the differential information to an OFF state upon receiving a command for restoring backup data stored in the external memory medium to the secondary volume from a maintenance terminal connected to a communication medium or a host computer connected to a communication medium.

10. The initial copy method of a storage system according to claim 8, wherein the secondary controller executes:

a step of setting the entire initial copy target area of the secondary volume to an unwritten status and setting all bits of differential information for managing information of the initial copy target area to an ON state upon receiving the pair creation command from the primary controller with the mode information indicating the minimum copy mode;

a step of thereafter copying the update data sent from the primary controller to the initial copy target area of the secondary volume and setting bits corresponding to a storage location of the update data among the differential information to an OFF state upon receiving a command for copying the update data from the primary controller; and a step of subsequently copying the backup data to areas where bits of the differential information are in an ON state within the initial copy target area of the secondary volume and setting a bit corresponding to a storage location of the backup data among the differential information to an OFF state upon receiving a command for restoring backup data stored in the external memory medium to the secondary volume from a maintenance terminal connected to a communication medium or a host computer connected to a communication medium; and wherein the primary controller and the secondary controller execute a step of completing the remote copy on the condition that all bits of the differential information are in an OFF state.

* * * * *